(12) United States Patent
Hori

(10) Patent No.: US 9,460,325 B2
(45) Date of Patent: Oct. 4, 2016

(54) WIRELESS TAG INITIALIZATION DEVICE AND WIRELESS TAG INITIALIZATION METHOD

(71) Applicant: TOSHIBA TEC KABUSHIKI KAISHA, Tokyo (JP)

(72) Inventor: Fusao Hori, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 248 days.

(21) Appl. No.: 14/162,580

(22) Filed: Jan. 23, 2014

(65) Prior Publication Data

US 2014/0203918 A1 Jul. 24, 2014

(30) Foreign Application Priority Data

Jan. 23, 2013 (JP) ................. 2013-010091

(51) Int. Cl.
*G06K 7/10* (2006.01)

(52) U.S. Cl.
CPC ....... *G06K 7/10217* (2013.01); *G06K 7/10079* (2013.01)

(58) Field of Classification Search
CPC ................. G06K 7/10217; G06K 7/10079; B41J 3/4075
See application file for complete search history.

(56) References Cited

U.S. PATENT DOCUMENTS

| 5,966,082 A * | 10/1999 | Cofino ............... G06K 19/0723 340/10.51 |
| 2005/0274799 A1* | 12/2005 | Torchalski ............. B41J 3/4075 235/432 |
| 2010/0060425 A1* | 3/2010 | Rodriguez ............... H04Q 9/00 340/10.1 |

FOREIGN PATENT DOCUMENTS

JP 2008-134711 A 6/2008

* cited by examiner

*Primary Examiner* — Nabil Syed
(74) *Attorney, Agent, or Firm* — Patterson & Sheridan, LLP

(57) ABSTRACT

A wireless tag initialization device includes a reader and writer that weakens supply power to a first threshold value at which a wireless tag to be initialized is activated and other wireless tags are not activated, transmit a first command to invert a flag of the wireless tag to be initialized, increases the supply power to a second threshold value which is sufficient to write an initial value, and writes the initial value in the wireless tag with the inverted SL flag.

11 Claims, 3 Drawing Sheets

WIRELESS TAG INITIALIZATION DEVICE AND WIRELESS TAG INITIALIZATION METHOD

CROSS-REFERENCE TO RELATED APPLICATION

This application is based upon and claims the benefit of priority from Japanese Patent Application No. 2013-010091, filed Jan. 23, 2013, the entire contents of which are incorporated herein by reference.

FIELD

Embodiments described herein relate generally to a wireless tag initialization device and a wireless tag initialization method.

BACKGROUND

A wireless tag stores information therein by an electromagnetic method. The wireless tag is identified by reading the information stored in the wireless tag using a reader.

Initialization of the wireless tag means that the identification information is written in the wireless tag.

If a large number of wireless tags need to be initialized, a wireless tag initialization device is used. The wireless tag initialization device continuously initializes plural wireless tags supported on amount using one reader and writer. Therefore, a problem of how to specify a wireless tag to be initialized needs to be addressed.

In a wireless tag initialization device of the related art, the intensity of response waves from wireless tags is measured to specify a tag to be initialized.

However, some wireless tags output response waves with a predetermined intensity regardless of the intensity of received power. As a result, such a type of wireless tag cannot be specified as a tag to be initialized using methods of the related art.

DETAILED DESCRIPTION

Accordingly, embodiments provide a wireless tag initialization device and a wireless tag initialization method capable of continuously initializing wireless tags which output response waves with a predetermined intensity regardless of the intensity of received power.

In general, according to one embodiment, there is provided a wireless tag initialization device including a reader and writer configured to weaken supply power to a first threshold value at which a wireless tag to be initialized is activated and other wireless tags are not activated, transmit a first command to invert a flag of the wireless tag to be initialized, transmit a second command to transition a state of the wireless tag with the inverted flag to a response state, increases the supply power to a second threshold value which is sufficient to write an initial value, and transmit a third command to write the initial value in the wireless tag.

Hereinafter, embodiments of a wireless tag initialization device and a wireless tag initialization method will be described in detail with reference to drawings.

Figure 1:
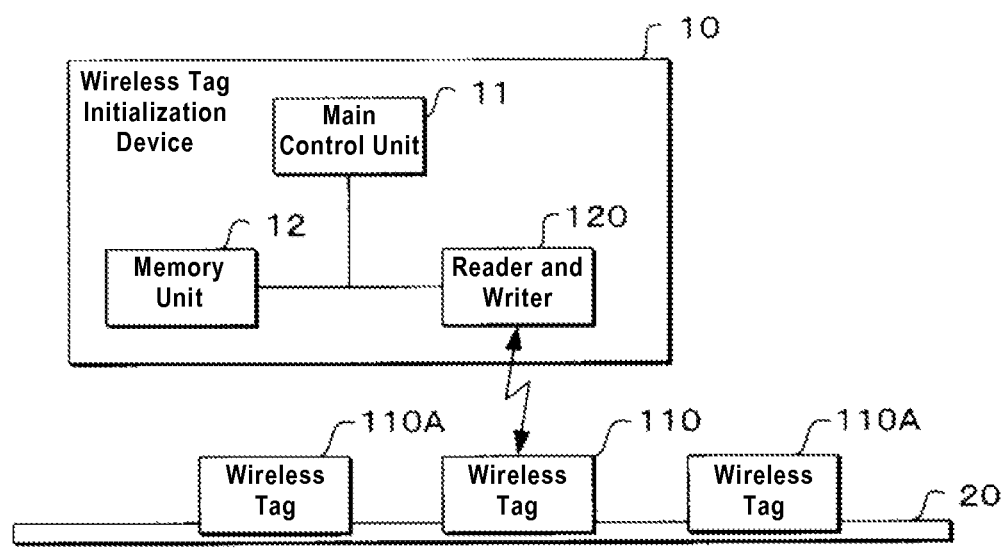
FIG. 1 is a view showing a configuration of a wireless tag initialization device.

FIG. 1 is a view showing a configuration of a wireless tag initialization device 10 according to the embodiment. As shown in FIG. 1, the wireless tag initialization device 10 includes a main control unit 11 having a CPU, a memory unit 12, such as a ROM, a RAM, a flash ROM, and a hard disk drive, and a reader and writer 120 which reads and writes information from and to a wireless tag 110.

The memory unit 12 stores an initial value, a first threshold value, a second threshold value, and a third threshold value, which will be described later.

The main control unit 11 and the memory unit 12 of the wireless tag initialization device 10 may serve as a reader and writer control unit 126 which will be described later.

The wireless tag initialization device 10 initializes the wireless tag 110 supported on a mount 20 using the reader and writer 120 and does not initialize other wireless tags 110A at the same time.

The wireless tag initialization device 10 changes and initializes the wireless tag 110 to be sequentially initialized among the wireless tags 110 and 110A supported on the mount 20 using the reader and writer 120.

Figure 2:
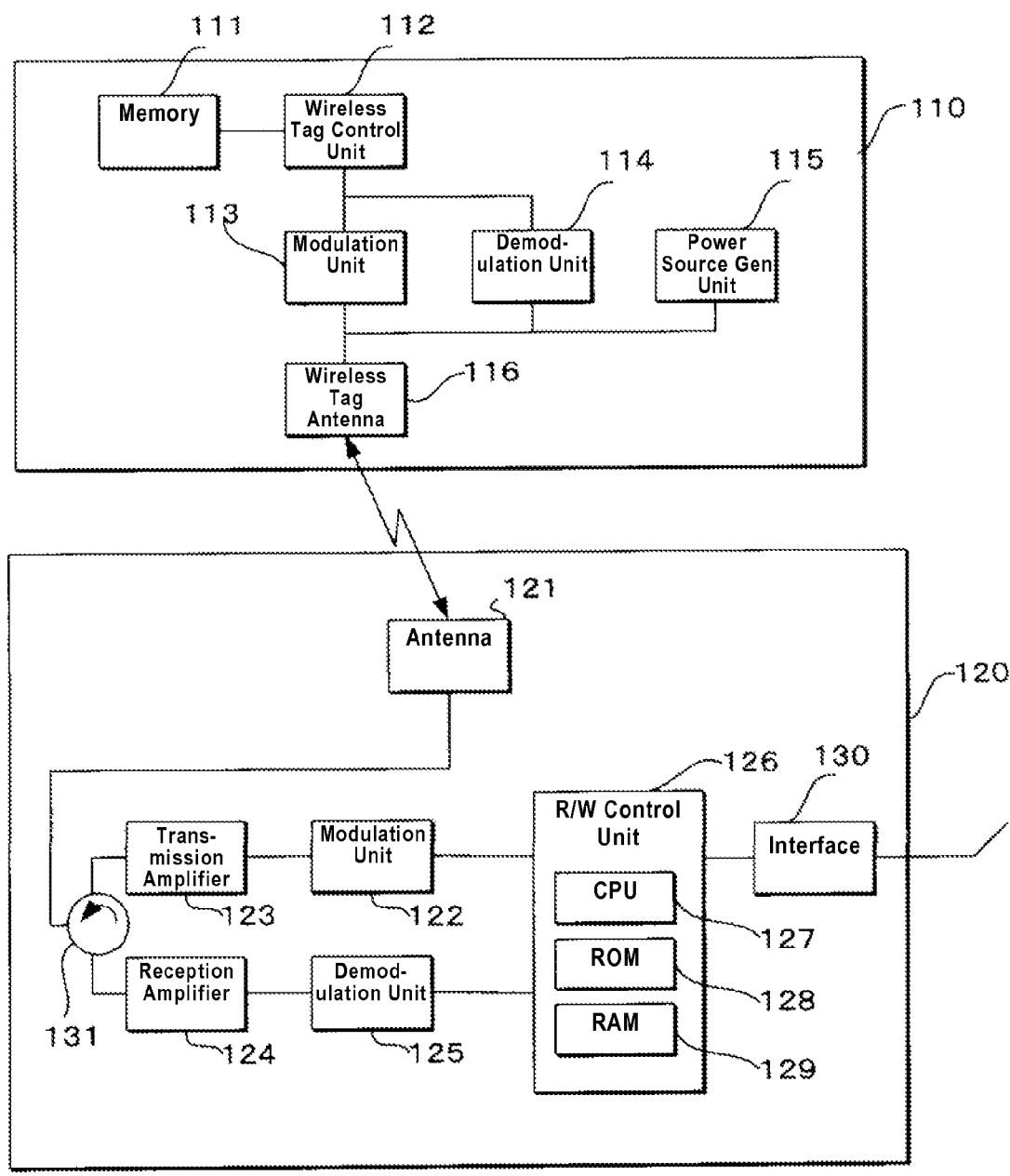
FIG. 2 is a block diagram showing configurations of a wireless tag and a reader and writer.

FIG. 2 is a block diagram showing the configurations of the wireless tag 110 and the reader and writer 120. As shown in FIG. 2, the wireless tag 110 includes a memory 111 as a memory unit, a wireless tag control unit 112 which performs reading and writing of data in the memory 111, a power source generating unit 115 which supplies power by rectifying and stabilizing received modulated electromagnetic waves, a wireless tag antenna 116 as an antenna for transmitting and receiving a signal, a modulation unit 113 which modulates the data transmitted from the wireless tag control unit 112 to transmit the data to the wireless tag antenna 116, and a demodulation unit 114 which demodulates the received electromagnetic waves to transmit the electromagnetic waves to the wireless tag control unit 112.

The reader and writer 120 includes the reader and writer control unit 126 which controls communication with the wireless tag 110, a modulation unit 122 which modulates a signal transmitted from the reader and writer control unit 126, a transmission amplifier 123 which amplifies the modulated signal to transmit the signal to an antenna 121 through a circulator 131, a reception amplifier 124 which amplifies the modulated electromagnetic waves received from each antenna through the circulator 131, a demodulation unit 125 which demodulates the received modulated signal, and an interface 130 which is connected to a control unit of an image processing device (not shown) to send and receive data. In addition, the reader and writer control unit 126 has a CPU 127, and a ROM 128 and a RAM 129 as memories for storing data.

The initial value is stored in the memory 111 of the wireless tag 110 by the initialization operation of the wireless tag initialization device 10. The initial value is, for example, the same as a value indicated by a bar code attached on the wireless tag 110.

Figure 3:
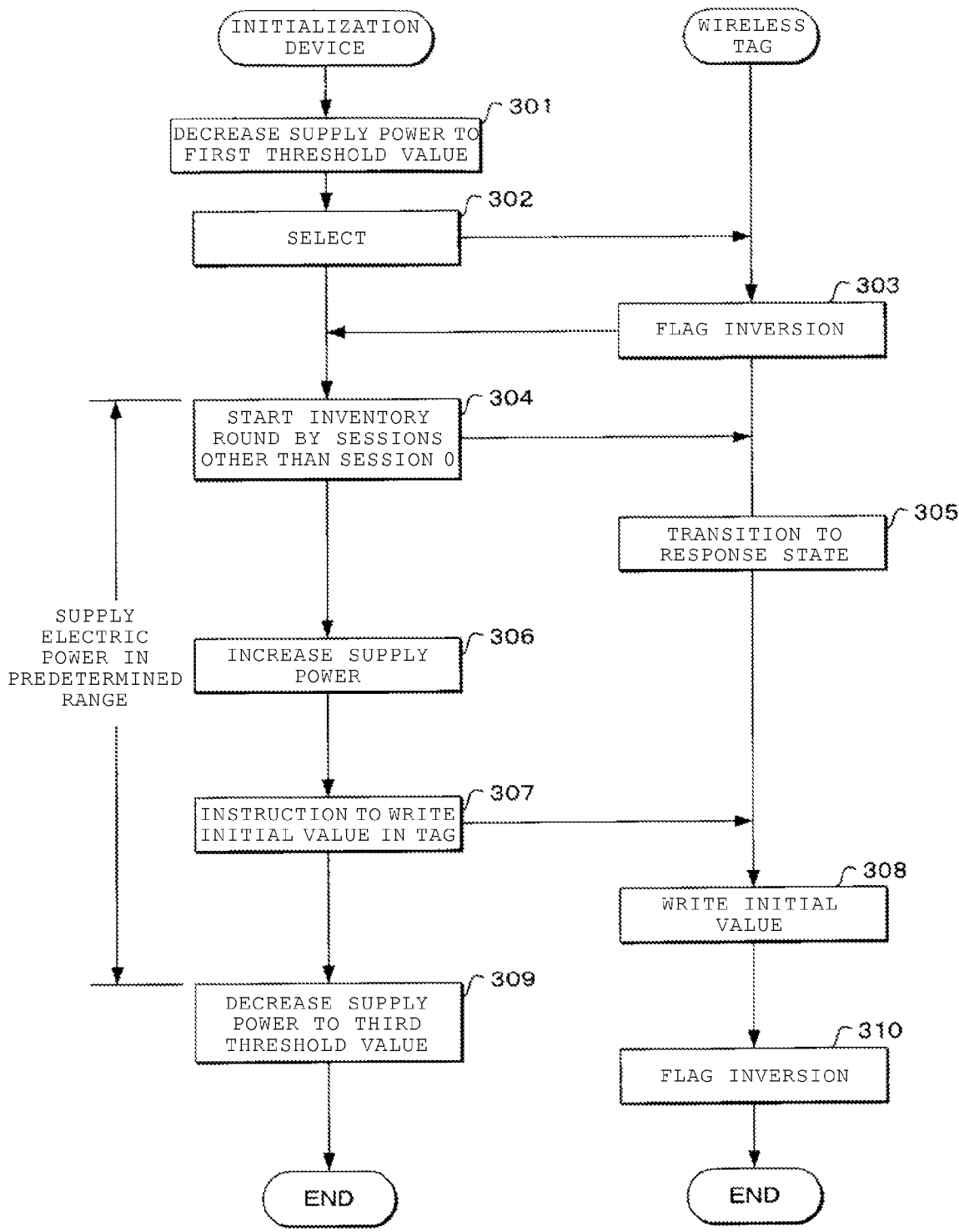
FIG. 3 is a flowchart showing an initialization operation of the wireless tag initialization device.

FIG. 3 is a flowchart showing the initialization operation of the wireless tag initialization device 10. As shown in FIG. 3, the wireless tag initialization device 10 decreases supply power to a first threshold value in Step 301.

Here, the first threshold value is electric power at which only the wireless tag 110 to be initialized is activated and other wireless tags 110A are not activated. With the electric power, only the wireless tag 110 which is closest to the antenna 121 of the reader and writer 120 is activated.

The first threshold value is obtained by measuring the electric power in which only the wireless tag 110 which is closest to the antenna 121 of the reader and writer 120 is activated in advance, and then, is stored in the memory unit 12 of the wireless tag initialization device 10.

In Step 302, the wireless tag initialization device 10 transmits the select command to the wireless tag 110 to be initialized to select the wireless tag.

In Step 303, the wireless tag 110 inverts an SL flag.

The wireless tag 110 maintains A or B as an SL flag. For example, if an initial value of the SL flag that the wireless tag 110 maintains is A, the wireless tag 110 receives a select command to invert the SL flag to B.

Here, the wireless tags 110A which are not wireless tags to be initialized are not activated since the supply power is less than activation power, and the SL flag is not inverted. Therefore, the SL flag is inverted in only the wireless tag 110 to be initialized.

In this case, while the supply power from the wireless tag initialization device 10 can invert the flag of the wireless tag 110, the supply power is too weak to write the initial value.

In Step 304, the wireless tag initialization device 10 transmits a Query command and an inventory round is started by Sessions other than Session 0.

At this time, the wireless tag initialization device 10 transmits the Query command to the wireless tag 110 in which the SL flag is inverted.

In Sessions other than Session 0, that is, Sessions 1 to 3, the wireless tag 110 maintains the value of the SL flag for a predetermined period of time even when the power supply to the wireless tag 110 is stopped.

In Step 305, when the wireless tag 110 in which the SL flag is inverted receives the Query command, the SL flag in which the parameter of the Query command is inverted is matched and therefore, the state of the wireless tag transitions to a response state and the state of other wireless tags 110A transitions to a standby state.

When the state of the wireless tag 110 transitions to the response state, the wireless tag can receive the Write command. Since the state of other wireless tags 110A transitions to the standby state, other wireless tags cannot receive a Write command.

In Step 306, the wireless tag initialization device 10 increases the supply power to a second threshold value in which an initial value can be written.

In Step 308, the wireless tag initialization device 10 transmits an instruction to write the initial value in the wireless tag 110 by the Write command.

In Step 309, the wireless tag 110 stores the initial value in the memory 111.

That is, only the wireless tag 110 in the response state receives the Write command, and writes the initial value in the memory 111. Other wireless tags 110A in the standby state do not receive the Write command.

In Step 310, the supply power is decreased to a third threshold value. The third threshold value is a weak electric power at which the wireless tag 110 inverts the SL flag.

The supplied electric power may be weakened by moving the wireless tag 110.

In Step 311, the SL flag that the wireless tag 110 maintains, B in the above example, is inverted to A.

Here, from the above-described Steps 304 to 310, that is, within one inventory round, the wireless tag initialization device 10 maintains the supply power in a range of higher than the third threshold value in which the wireless tag 110 inverts the SL flag again and equal to or lower than the first threshold value in which only the wireless tag 110 to be initialized is activated.

As described above, the wireless tag initialization device 10 according to the embodiment includes the reader and writer 120 that weakens supply power to the first threshold value in which only the wireless tag 110 to be initialized is activated and other wireless tags 110A are not activated, inverts the SL flag of the wireless tag to be initialized, starts an inventory round by Sessions other than Session 0 to transition the state of only the wireless tag 110 with the inverted SL flag to a response state, increases the supply power to the second threshold value which is sufficient to write an initial value, and transmits a command to write the initial value in the wireless tag 110.

Accordingly, there is obtained an effect that the wireless tags which output response waves with a predetermined intensity regardless of the intensity of received power can be continuously initialized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag initialization device comprising:
a reader and writer configured to
transmit a supply signal at a first power level sufficient to activate a first wireless tag which is within a predetermined distance from the reader and writer and insufficient to activate a second wireless tag that is more than the predetermined distance away from the reader and writer,
transmit a first command at the first power level to change a flag value of the first wireless tag that has been activated by the supply signal from a first flag value to a second flag value,
transmit a second command at the first power level to cause the first wireless tag with the second flag value to transition into a response state,
increase a power level of the supply signal to a second power level higher than the first power level,
transmit a third command while the supply signal is at the second power level to cause the first wireless tag that has transitioned into the response state to write an initial value therein, and
decrease the power level of the supply signal to a third power level lower than the first power level to change the flag value of the first wireless tag to which the initial value has been written, from the second flag value to the first flag value.

2. The device according to claim 1, wherein the reader and writer has an antenna and the wireless tag that is activated is positioned closer to the antenna than the second wireless tag.

3. The device according to claim 1, wherein
in response to the second command, the second wireless tag transitions into a standby state in which the second wireless tag does not receive the third command.

4. A wireless tag initialization method of controlling a reader and writer, comprising:

transmitting a supply signal at a first power level sufficient to activate a first wireless tag and insufficient to activate a second wireless tag that is farther away from the reader and writer than the first wireless tag;

transmitting a first command at the first power level to change a flag value of the first wireless tag that has been activated by the supply signal from a first flag value to a second flag value;

transmitting a second command at the first power level to cause the first wireless tag with the second flag value into a response state;

increasing a power level of the supply signal to a second power level higher than the first power level;

transmitting a third command while the supply signal is at the second power level to cause the first wireless tag that has transitioned into the response state to write an initial value therein; and decreasing the power level of the supply signal to a third power level lower than the first power level to change the flag value of the first wireless tag to which the initial value has been written, from the second flag value to the first flag value.

5. The method according to claim 4, wherein the reader and writer has an antenna and the wireless tag that is activated is positioned closer to the antenna than the second wireless tag.

6. The method according to claim 4, wherein
in response to the second command, the second wireless tag transitions into a standby state in which the second wireless tag does not receive the third command.

7. A wireless tag initialization system, comprising:
a reader and writer and a plurality of wireless tags including a first wireless tag and a second wireless tag, the reader and writer configured to
transmit a supply signal at a first power level sufficient to activate the first wireless tag that is closer to the reader and writer than the second wireless tag and insufficient to activate the second wireless tag, transmit a first command at the first power level to change a flag value of the first wireless tag that has been activated by the supply signal from a first flag value to a second flag value, transmit a second command at the first power level to cause the first wireless tag with the second flag value to transition into a response state, increase a power level of the supply signal to a second power level higher than the first power level, transmit a third command while the supply signal is at the second power level to cause the first wireless tag that has transitioned into the response state to write an initial value therein, and decrease the power level of the supply signal to a third power level lower than the first power level to change the flag value of the first wireless tag to which the initial value has been written, from the second flag value to the first flag value.

8. The system according to claim 7, wherein the reader and writer has an antenna and the first wireless tag is positioned closer to the antenna than the second wireless tag.

9. The system according to claim 8, wherein the wireless tags are arranged to be moved relative to the antenna such that the first wireless tag is moved away from the antenna after the initial value is written therein and the second wireless tag is moved closer to the antenna.

10. The system according to claim 9, wherein the wireless tags are commonly mounted on a conveying unit that is movable relative to the antenna.

11. The system according to claim 7, wherein
in response to the second command, the second wireless tag transitions into a standby state in which the second wireless tag does not receive the third command.

* * * * *